(12) United States Patent

Anderson et al.

(10) Patent No.: US 12,675,084 B2

(45) Date of Patent: Jul. 7, 2026

(54) DATA FORECAST FOR SUBSTATIONS IN ELECTRICAL GRIDS

(71) Applicant: S&P Global Inc., New York, NY (US)

(72) Inventors: Duncan Anderson, Ithaca, NY (US); Oscar Vasquez, Houston, TX (US); Nikita Sharma, Hoshiarpur (IN); Antonio Aramoni, Mexico City (MX); Barclay Gibbs, Potomac, MD (US)

(73) Assignee: S&P Global Inc., New York, NY (US)

( * ) Notice: Subject to any disclaimer, the term of this patent is extended or adjusted under 35 U.S.C. 154(b) by 351 days.

(21) Appl. No.: 18/590,335

(22) Filed: Feb. 28, 2024

(65) Prior Publication Data

US 2025/0271821 A1 Aug. 28, 2025

(51) Int. Cl.
*G05B 13/02* (2006.01)

(52) U.S. Cl.
CPC ................................ *G05B 13/0265* (2013.01)

(58) Field of Classification Search
None
See application file for complete search history.

(56) References Cited

U.S. PATENT DOCUMENTS

2023/0214703 A1 * 7/2023 Maheswari ............ G06N 3/088
700/291

* cited by examiner

*Primary Examiner* — Ryan A Jarrett

(74) *Attorney, Agent, or Firm* — Yee & Associates, P.C.

(57) ABSTRACT

A computer-implemented method is provided. A processor set selects a number of nodes. The processor set filters anomalous data from historical data for each node in the number of nodes to generate a refined historical data. The processor set trains a number of computational models using the refined historical data to generate a number of machine learning models for forecasting electrical rate deviation and fluctuation for the number of nodes. The processor set assigns a composite performance score to each machine learning model based on performance for each machine learning model. The processor set computes anomalous electrical rate fluctuation based on the anomalous data for each node using a stochastic model. The processor set generates a forecast comprising anomalous electrical rate fluctuation, and electrical rate fluctuation and deviation for the number of nodes for a period of time.

30 Claims, 8 Drawing Sheets

500 — IDENTIFY A SET OF NODES
FROM THE ELECTRICAL GRID

502 — CLUSTER THE SET OF NODES FROM THE
ELECTRICAL GRID INTO A NUMBER OF
CLUSTERS BASED ON ELECTRICAL RATE
FLUCTUATION AND GEOGRAPHIC LOCATIONS
FOR EACH NODE FROM THE SET OF NODES

504 — SELECT A NODE FROM EACH CLUSTER
TO GENERATE THE NUMBER OF NODES

DATA FORECAST FOR SUBSTATIONS IN ELECTRICAL GRIDS

BACKGROUND INFORMATION

1. Field

The present disclosure relates generally to data forecasting, and more specifically to forecast data for substations in electrical grid for an area.

2. Background

Substations are integral components within an electrical grid. Substations serve vital functions in the transmission and distribution of electricity. In this case, substations ensure that electricity generated at power plants is appropriately transformed to lower voltages suitable for distribution to homes, businesses, and industrial facilities. These voltage transformations are fundamental for the efficient and safe operation of the electrical grid. Substations act as distribution hubs to facilitate the transfer of electricity to different areas within a region.

Additionally, substations are equipped with switching and protection mechanisms that allow operators to control the flow of electricity and isolate specific sections of electrical grid for maintenance in case of fault and outages.

Further, substations play a crucial role in the connection of renewable energy sources, such as solar and wind farms to the grid. Substations manage the integration of fluctuating renewable energy output, contributing to the overall diversification of the energy mix.

SUMMARY

According to one illustrative embodiment, a computer-implemented method is provided. A processor set selects a number of nodes. Each node in the number of nodes represents a substation in an area for an electrical grid. The processor set filters anomalous data from historical data for each node in the number of nodes using a hybrid approach that combines statistical anomaly detection with domain-specific rules, thereby generating a refined historical data. The processor set trains a number of computational models using the refined historical data for each node in the number of nodes to generate a number of machine learning models for forecasting both short-term and long-term electrical rate deviation and fluctuation for the number of nodes. The processor set assigns a composite performance score to each machine learning model from the number of machine learning models based on a weighted combination of performance metrics for each machine learning model. The processor set computes anomalous electrical rate fluctuation based on the anomalous data from historical data for each node using a stochastic model that incorporates domain-specific factors. The processor set generates an integrated forecast comprising both the anomalous electrical rate fluctuations, and fluctuation and deviation in electrical rate for the number of nodes for a period of time, wherein the fluctuation and deviation in electrical rate are forecasted using the machine learning model with highest composite performance score from the number of machine learning models. According to other illustrative embodiments, a computer system, and a computer program product for optimizing source code are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of considerations. For example, the illustrative embodiments recognize and take into account that electrical rate in the electrical grid varies based on several factors. The illustrative embodiments recognize and take into account that one primary factor driving the electrical rate in the electrical grid is the supply-demand dynamic of electricity.

The illustrative embodiments also recognize and take into account that current forecast models for electrical grids usually do not consider anomalous electrical rate increases driven by outage events and natural disasters when making forecasts.

The illustrative embodiments also recognize and take into account that even though heuristic methods can improve forecasts on zonal electrical rate, they suffer low accuracy and understate locational marginal pricing (LMP) basis volatility and are unlikely to produce energy storage operational schedules that are distinct from zonal price valuation.

The illustrative embodiments also recognize and take into account that a forecast for an electrical grid requires a complete analysis of locations and involves the development of a bottom-up engineering-based dispatch model that can be hindered by development time, compute time, and data limitations.

The illustrative embodiments provide a model construction method for generating forecasts for electrical grids. This method excels in accurately providing forecasts that consider both normal operations for electrical grids and unusual events for electrical grids.

Figure 1:
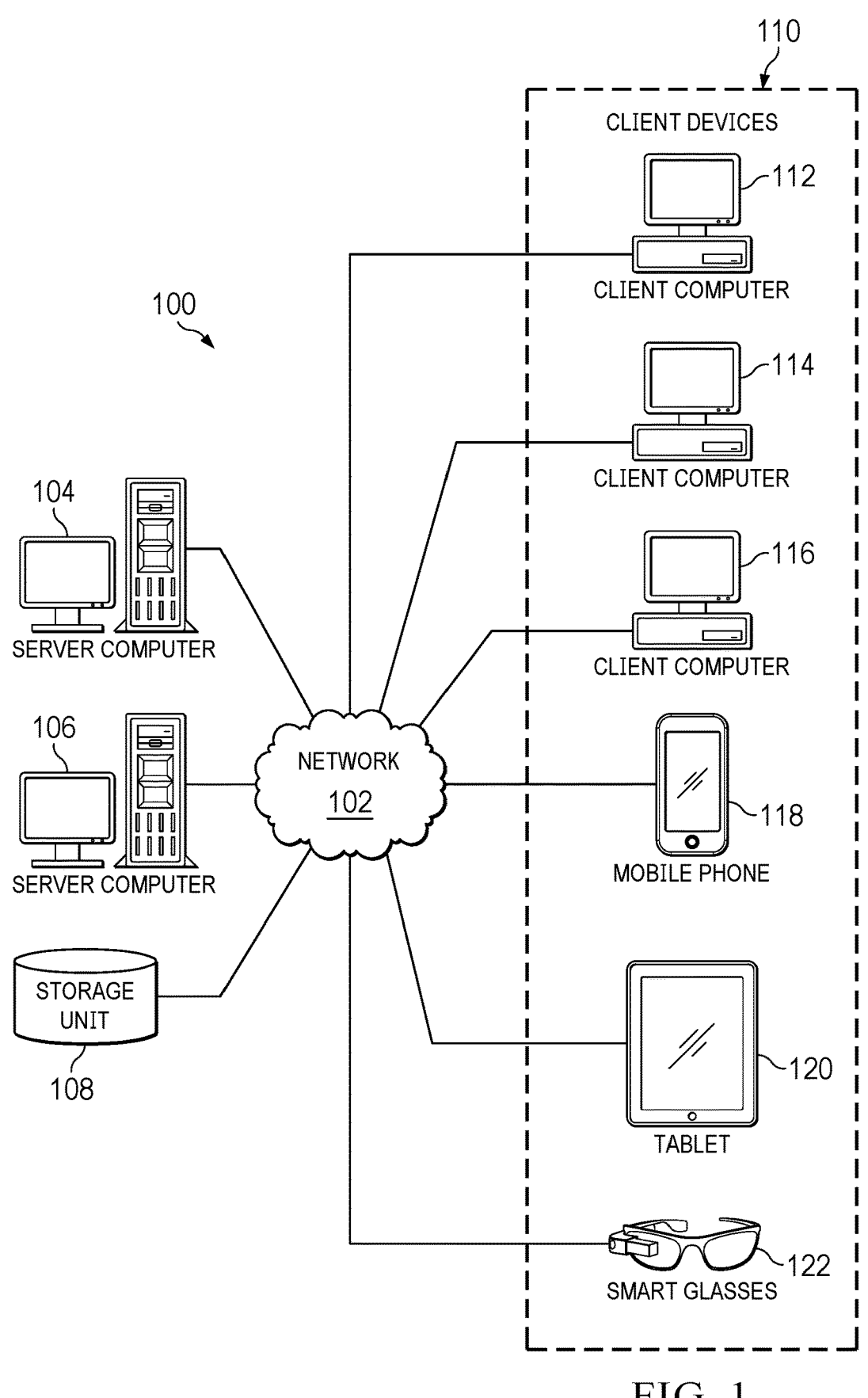
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
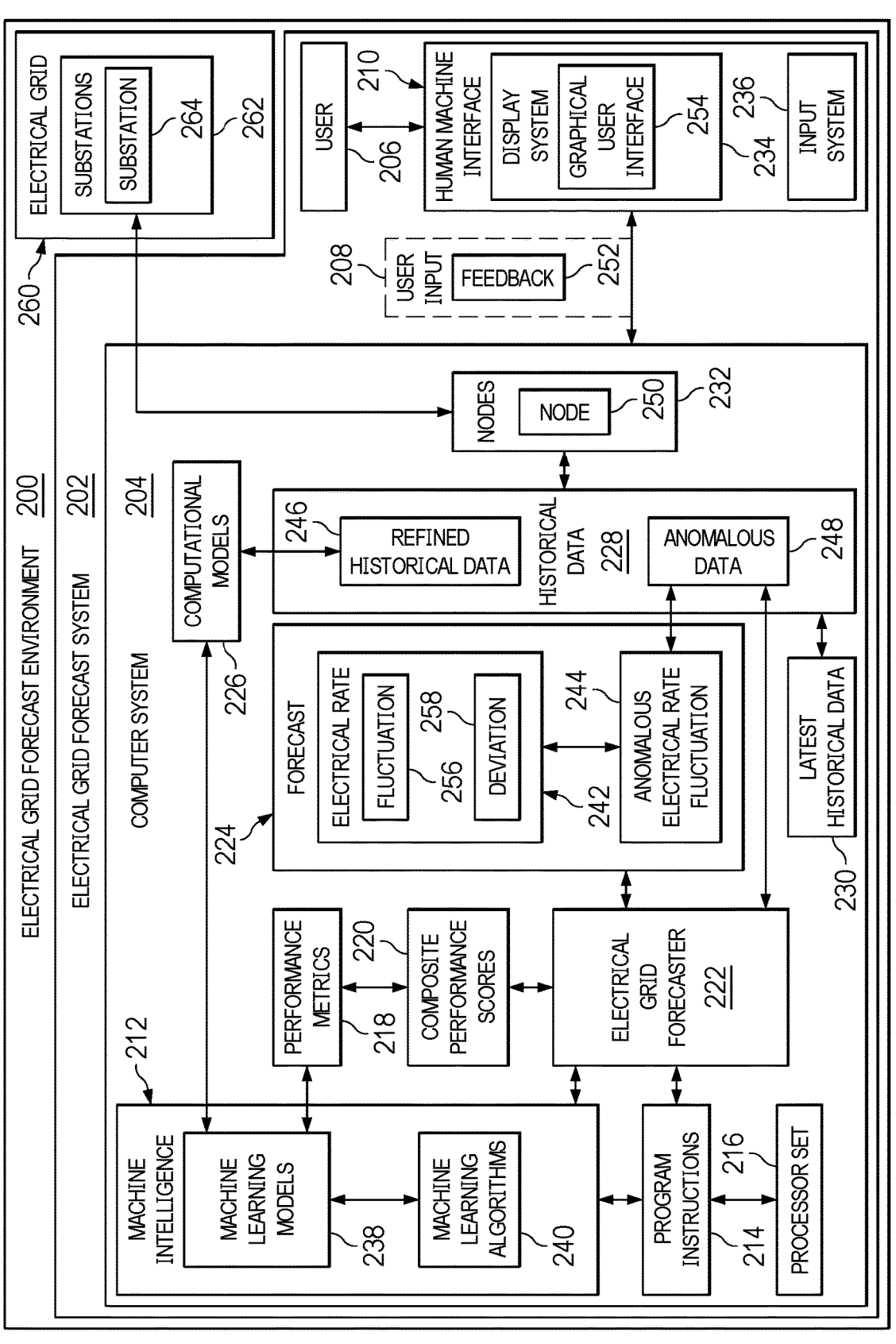
FIG. 2 is a block diagram of an electrical grid forecast environment depicted in accordance with an illustrative embodiment.

With reference now to FIG. 2, an illustration of a block diagram of an electrical grid forecast environment is depicted in accordance with an illustrative embodiment. In this illustrative example, electrical grid forecast environment 200 includes components that can be implemented in hardware such as the hardware shown in network data processing system 100 in FIG. 1.

In this illustrative example, electrical grid forecast system 202 in electrical grid forecast environment 200 generates forecasts for data associated with an electrical grid and substations within the electrical grid. Data associated with the electrical grid and substations can be the electrical rate for each substation in the electrical grid. Electrical rate is the locational basis that represents the cost associated with procuring a marginal unit of wholesale electrical energy at a specific location and time relative to the hub. In this illustrative example, cost can be determined based on marginal energy costs, the impacts of grid congestion, and the impact of energy losses during transmission for each substation.

In this illustrative example, electrical grid forecast system 202 includes computer system 204 and electrical grid forecaster 222. Electrical grid forecaster 222 is located in computer system 204.

Electrical grid forecaster 222 can be implemented in software, hardware, firmware, or a combination thereof. When software is used, the operations performed by electrical grid forecaster 222 can be implemented in program instructions configured to run on hardware, such as a processor unit. When firmware is used, the operations performed by electrical grid forecaster 222 can be implemented in program instructions and data and stored in persistent memory to run on a processor unit. When hardware is employed, the hardware can include circuits that operate to perform the operations in electrical grid forecaster 222.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, when used with reference to items, "a set of" means one or more of the items. For example, "a set of clouds" is one or more different types of cloud environments.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes nodes 232. Nodes 232 are representations of substations 262 in electrical grid 260. Each node in nodes 232 represents a substation in substations 262. For example, node 250 represents substation 264 in substations 262 for electrical grid 260.

In this illustrative example, nodes 232 do not necessarily represent all substations in electrical grid 260. In other words, nodes 232 that represent substations 262 can be a portion of substitutions that is representative for electrical grid 260.

For example, nodes 232 can be selected by clustering all substations in electrical grid 260. In this illustrative example, clustering of substations in electrical grid 260 can be performed based on electrical rate fluctuation and geographic location for substations in electrical grid 260. Geographic location for substations can be determined based on latitude-longitude of substations. Substations that have high correlations can be clustered together. In other words, substations with similar electrical rate fluctuations and geographic locations are classified into same clusters.

In this example, substations 262 can be generated by randomly selecting a substation in each cluster. By using such a method, time and resources required for processing all substations in electrical grid 260 can be reduced in an efficient manner without losing accuracy.

As depicted, historical data 228 contains information associated with nodes 232. For example, historical data 228 can include electrical rate for nodes 232, historical electrical rate trend for nodes 232, zonal price, zonal price differentials, locational marginal pricing, locational marginal pricing basis for nodes 232, energy generations such as hydroelectric generation and renewable energy generation, and domain-specific rules and factors.

In this example, domain-specific rules and factors can include generation capacity, type of energy sources for electricity generation, weather conditions, transmission and distribution infrastructure, market structure, or any factors or rules associated with supply and demand dynamics for electrical grid 260.

In this illustrative example, historical data 228 includes anomalous data 248. Anomalous data 248 are statistical outliers that result from outage events or natural disasters. For example, the cost of energy fluctuates dramatically for substations that experience power outages due to unusual events such as transmission failure and surplus demand due to natural disasters such as heat waves. In other words, those unusual fluctuations caused by unusual events do not result from normal operation of nodes 232 and therefore are considered as outliers.

In this illustrative example, anomalous data 248 can be detected for each node using a statistical anomaly detection with domain-specific rules. Statistical anomaly detection mainly aims to capture the behavior of outage events. The effects of these outage events decay as a function of distance and constitute a portion of anomaly electrical rate distribution that overlaps with the normal distribution for electrical rate for nodes. In other words, electrical rates for adjacent nodes are a critical factor when identifying statistical outliers for a node in nodes 232.

In addition, electrical grid forecaster 222 can generate time-series features for each node for identifying anomalous data 248. In this illustrative example, time-series features are based on locational marginal pricing (LMP) form the basis of data for each node from nodes 232. For example, time-series features can be statistical features including mean, median, standard deviation, variance, kurtosis, inter-quartile range, or any suitable statistical features that can be used for time-series analysis.

Further, additional time-series can be generated based on impact of calendar related factors such as month, weekday-weekend split, night-day split, time lags, and seasonality.

In this illustrative example, electrical grid forecaster 222 uses statistical anomaly detection with generated time-series features to analyze the nearest 20 nodes for each node in nodes 232. The nearest 20 nodes for each node can be weighted exponentially based on proximity between the nearest 20 nodes to each node. In this illustrative example, electrical grid forecaster 222 can also use isolation forest to detect anomalous data 248.

An ensemble voting method can be used to define the final set of statistical outliers for each node. For example, statistical outliers can be designated when they can be detected as outliers multiple times in different samples.

In this illustrative example, anomalous data 248 includes statistical outliers identified using statistical anomaly detection for each node in nodes 250. In addition, refined historical data 246 can be generated by filtering anomalous data 248 from historical data 228.

Computer system 204 further includes machine intelligence 212. Machine intelligence 212 includes machine learning models 238 and machine learning algorithms 240. Machine learning is a branch of artificial intelligence (AI) that enables computers to detect patterns and improve performance without direct programming commands. Rather than relying on direct input commands to complete a task, machine learning relies on input data. The data is fed into the machine, one of machine learning algorithms 240 is selected, parameters for the data are configured, and the machine is instructed to find patterns in the input data through optimization algorithms. The data model formed from analyzing the data is then used to predict future values. In this illustrative example, the learning of the machine learning models 238 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for machine learning models 238.

In addition, machine intelligence 212 can also include deep learning and deep learning algorithms. Deep learning is a method of artificial intelligence that mimics the human brain's capacity to learn and adapt. Deep learning utilizes neural networks that have multiple layers for identifying and learning features from data. In this illustrative example, deep learning can use an iterative process such as backpropagation and gradient descent to refine its parameters to make accurate predictions by minimizing the difference between outputs and actual results.

In this illustrative example, machine intelligence 212 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 212.

Machine intelligence 212 can be implemented using one or more systems such as an artificial intelligence system, a neural network, a Generative adversarial network, a generative neural network, a Bayesian network, an expert system, a fuzzy logic system, a genetic algorithm, or other suitable types of systems. Machine learning models 238 and machine learning algorithms 240 may make computer system 204 a special purpose computer for optimizing source code.

Machine learning models 238 involves using machine learning algorithms 240 to build machine intelligence 212 based on samples of data such as refined historical data 246. The samples of data used for training are referred to as training data or training datasets.

In this illustrative example, machine learning model 238 can be generated by training computational models 226 using refined historical data 246. Computational models 226 can be a number of computational models that are open source models or commercially available models. For example, computational models 226 can be Light Gradient Boosting Model (LGBM), M5 Cubist Regression Model, Prophet model, an in-house cluster regression model, a 12×24 mean heuristic model, artificial neural network models, or any suitable open source models or commercially available models.

In this illustrative example, refined historical data 246 can be split into two sets of data. After splitting, the first set of data from refined historical data 246 can be used for training and the second set of data from refined historical data 246 can be used for validating machine learning models 238 after training.

Refined historical data 246 can be organized in a chronological order such that data in refined historical data 246 that are more recent can be used for validation. For example, data in refined historical data 246 from past two months can be used for validation while the rest of refined historical data 246 can be used for training.

In this illustrative example, electrical grid forecaster 222 accesses each machine learning model in machine learning models 238 based on performance metrics 218. Performance metrics 218 can include model error, a ratio of standard deviation of actual electrical rate for nodes 232 over a period of time and predicted electrical rate for nodes 232 over the same period of time, or any suitable performance metrics for determining accuracy of machine learning models. As a result, composite performance scores 220 are generated for machine learning models 238 based on performance metrics 218. In this illustrative example, machine learning models 238 can be ranked based on composite performance scores 220.

As depicted, machine intelligence 212 includes machine learning models 238 that can be trained using refined historical data 246. Machine intelligence 212 can be used to make predictions without being explicitly programmed to make these predictions and can be trained and retrained for a number of different types of applications. These applications include, for example, medicine, financial services, healthcare, speech recognition, computer vision, or other types of applications. In this example, a machine learning model can be trained for each node in nodes 232 and machine learning models 238 can be integrated into a management system for electrical grid 260.

Machine learning algorithms 240 can include supervised machine learning algorithms, unsupervised machine learning algorithms, and self-learning algorithms. Supervised machine learning can train machine learning models using data containing both the inputs and desired outputs. Examples of machine learning algorithms include XGBoost, K-means clustering, and random forest.

Electrical grid forecaster 222 can also compare latest historical data 230 with historical data 228 to determine whether retraining of machine learning models 238 is needed. Latest historical data 230 includes data that is more recent compared to historical data 228. In this illustrative example, electrical grid forecaster 222 determines whether there is a change of state of electrical rate fluctuations for nodes in nodes 232. A change of state of electrical rate fluctuations can occur when electrical rate fluctuations change permanently for a node in nodes 232.

For example, a change of state of electrical rate fluctuation for node 250 can occur when a new infrastructure such as another substation is built in the same area as node 250. In this example, the electrical rate fluctuation for node 250 permanently changes because a new substation is built near node 250, thereby changing the supply-demand dynamic of electrical rate for node 250.

In this illustrative example, machine learning models 238 are retrained using latest historical data 230 when a change of state is detected upon comparing latest historical data 230 with historical data 228. Therefore, machine learning models 238 is continuously improving over time.

As depicted, electrical grid forecaster 222 uses machine learning models 238 to generate forecast 224 for nodes 232. Forecast 224 provides information and predictions on how electrical rate changes for nodes 232 over a period of time. For example, machine learning models 238 are responsible for predicting fluctuation 256 and deviation 258 of electrical rate 242 for nodes 232 over a period of time. Electrical grid forecaster 222 can select a machine learning model with the highest composite performance score based on composite performance scores 220 for generating forecast 224. In this illustrative example, the selected machine learning model is the model with lowest error and a standard deviation ratio closest to one.

In this illustrative example, fluctuation 256 of electrical rate 242 provides information on magnitude of variation in electrical rate for nodes 232 over a period of time. In addition, deviation 258 of electrical rate 242 provides information on how much forecast 224 can differ from average market values of electrical rate for nodes 232 over a period of time.

Electrical grid forecaster 222 can also use a stochastic model that incorporates domain-specific factors to determine anomalous electrical rate fluctuation 244 based on anomalous data 248. In this illustrative example, anomalous electrical rate fluctuation 244 contains information associated with predicted electrical rate fluctuations for unusual events as depicted above.

Electrical grid forecaster 222 combines anomalous electrical rate fluctuation 244 with fluctuation 256 and deviation 258 for electrical rate 242 to generate forecast 224 for nodes in nodes 232. Forecast 224 provides comprehensive forecast by including prediction of electrical rate for nodes 232 during normal operations and prediction of electrical rate for nodes 232 during unusual events.

In this illustrative example, user 206 can interact with computer system 204 to coordinate the generation of forecast 224 and review forecast 224. Computer system 204 can receive a user input 208 from user 206. In this example, user input 208 can be generated by user 206 using human machine interface (HMI) 210. As depicted, human machine interface 210 includes display system 234 and input system 236. Display system 234 is a physical hardware system and includes one or more display devices on which graphical user interface 254 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this illustrative example, graphical user interface 254 can be used to display information to user 206. For example, graphical user interface 254 can display forecast 224, composite performance scores 220, information that helps to generate composite performance scores 220, or any information associated with nodes 232 to user 206.

In this example, user 206 is a person that can interact with graphical user interface 254 through user input 208 generated by input system 236. Input system 236 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

As depicted, user 206 can review forecast 224 to determine accuracy of forecast 224 using additional data. For example, user 206 can review forecast 224 to determine whether fluctuation 256 and deviation 258 are realistic. After reviewing, user 206 can provide feedback 252 through user input 208 to electrical grid forecaster 222.

Electrical grid forecaster 222 can also use feedback 252 to perform retraining of machine learning models 238 to improve machine intelligence 212. In this illustrative example, machine learning algorithms 240 in machine intelligence 212 can use feedback from feedback 252 in user input 208 received from user 206 to retrain machine learning models 238 such that the accuracy and quality of forecasts generated by machine learning models 238 can be improved over time.

In one illustrative example, one or more solutions are present that overcome a problem with optimizing source code. As a result, one or more technical solutions may provide an ability to increase efficiency and accuracy in optimizing source code. Thus, the inconveniences and errors from manually updating source code in different versions can be reduced.

In the illustrative example, computer system 204 can be configured to perform at least one of the steps, operations, or actions described in the different illustrative examples using software, hardware, firmware, or a combination thereof. As a result, computer system 204 operates as a special purpose computer system in which electrical grid forecaster 222 in computer system 204 enables managing the execution of training computational models 226 to generate machine learning models 238, assessing performance for machine learning models 238, and generating forecast 224 for nodes 232 that represent substations 262 in electrical grid 260. In particular, electrical grid forecaster 222 transforms computer system 204 into a special purpose computer system as compared to currently available general computer systems that do not have electrical grid forecaster 222.

In the illustrative example, the use of electrical grid forecaster 222 in computer system 204 integrates processes into a practical application for optimizing source code that increases the performance of computer system 204. In other words, electrical grid forecaster 222 in computer system 204 is directed to a practical application of processes integrated into electrical grid forecaster 222 in computer system 204 that construct machine learning models for forecasting information associated electrical rate for electrical grid 260.

The illustration of electrical grid forecast environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, statistical measures other than fluctuation 256 and deviation 258 can be generated as part of forecast 224 for nodes 232. In another example, operation of electrical grid forecaster 222 can be conducted in parallel by utilizing a cloud computing platform.

Figure 3:
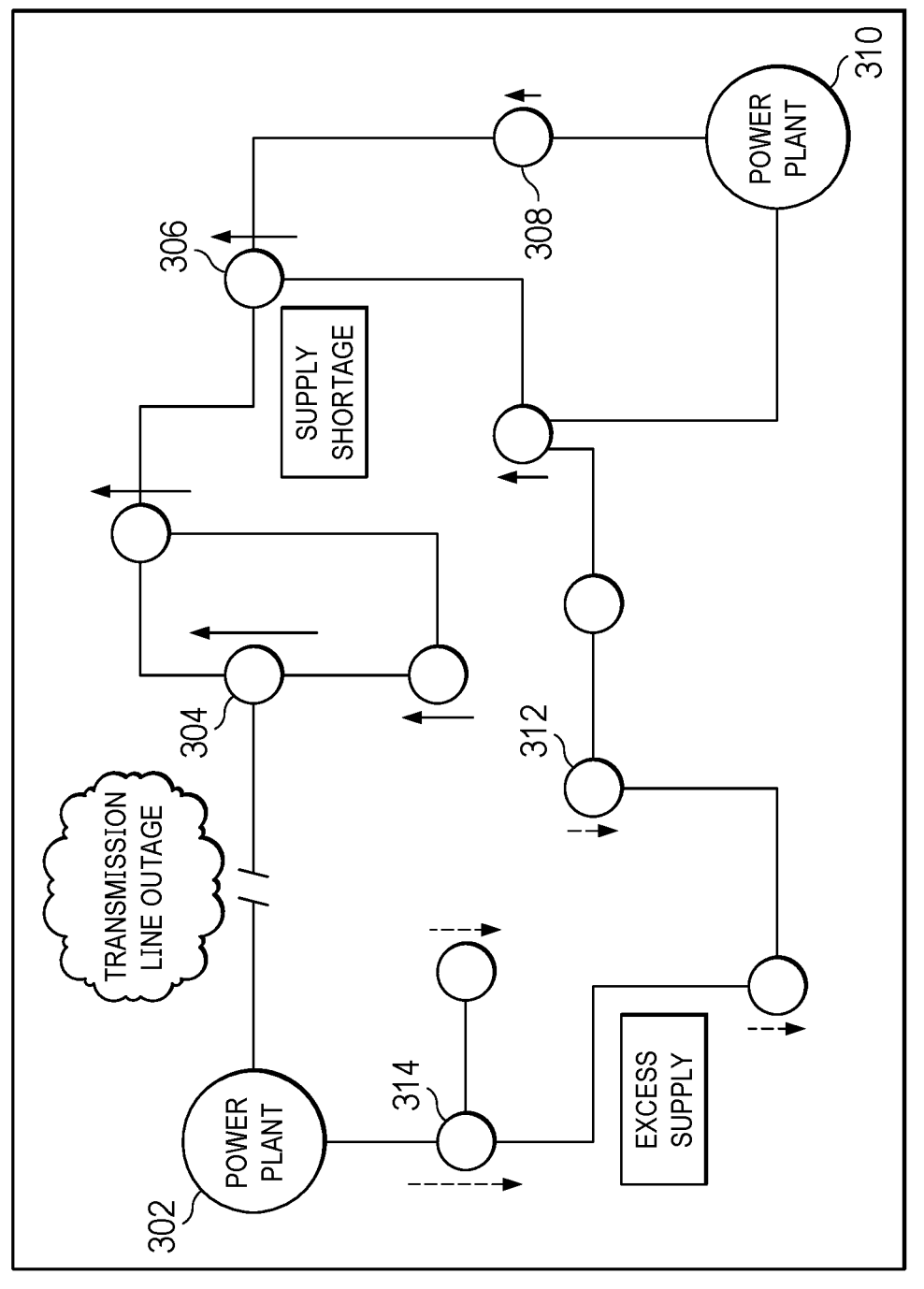
FIG. 3 depicts a diagram illustrating a decay of impact from an outage event in accordance with an illustrative embodiment.

FIG. 3 depicts a diagram illustrating a decay of impact from an outage event in accordance with an illustrative embodiment. The illustration in FIG. 3 can be used to identify anomalous data 248 in FIG. 2.

As depicted in FIG. 3, transmission line between power plant 302 and node 304 are experiencing an outage event. In this illustrative example, all nodes in FIG. 3 represent substations in electrical grid.

In FIG. 3, the outage event leads to an unusual increase of electrical rate for nodes that are closer to the location of the outage event. For example, the electrical rate increases dramatically in areas served by node 304 because the demand remains the same while the supply drops.

However, such impact of outage event decays over distance. For example, although the electrical rate increases for node 306, the magnitude of electrical rate increase for node 306 is less than the electrical rate increase for node 304 because power plant 310 also supplies electricity to node 306. Similarly, the electrical rate increase for node 308 is nominal because node 308 is very close to power plant 310 such that the supply shortage of electricity for node 308 is at minimal.

On the other hand, because of the outage event, power plant 302 can only supply electricity to substations that have functional transmission lines and therefore causing an excessive supply of electricity for those substations. For example, electrical rate decreases dramatically for node 314 because supply exceeds demand at node 314.

Such impact decays over distance too. Similar to node 308, electrical rate decreases for node 312 is minimal because the supply-demand dynamic merely changes for node 308.

In this illustrative example, electrical rate increases and decreases are considered as anomalous data because those fluctuations are not reflected from normal operations for substations. As depicted, those anomalous data are filtered from the training dataset for forecasting electrical rate fluctuations and deviations during normal substations operations.

However, because the outage events are common events that are going to recur over and over, the filtered anomalous data are also used for forecasting electrical rate fluctuations and deviations for future outage events. Therefore, a comprehensive forecast can be generated by combining electrical rate fluctuations and deviations for future normal substations operations and electrical rate fluctuations and deviations for future outage events.

The illustration of decaying impact from outage event shown in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, other factors such as the impact of calendar related factors, can be used to identify anomalous data for nodes in electrical grid too.

Figure 4:
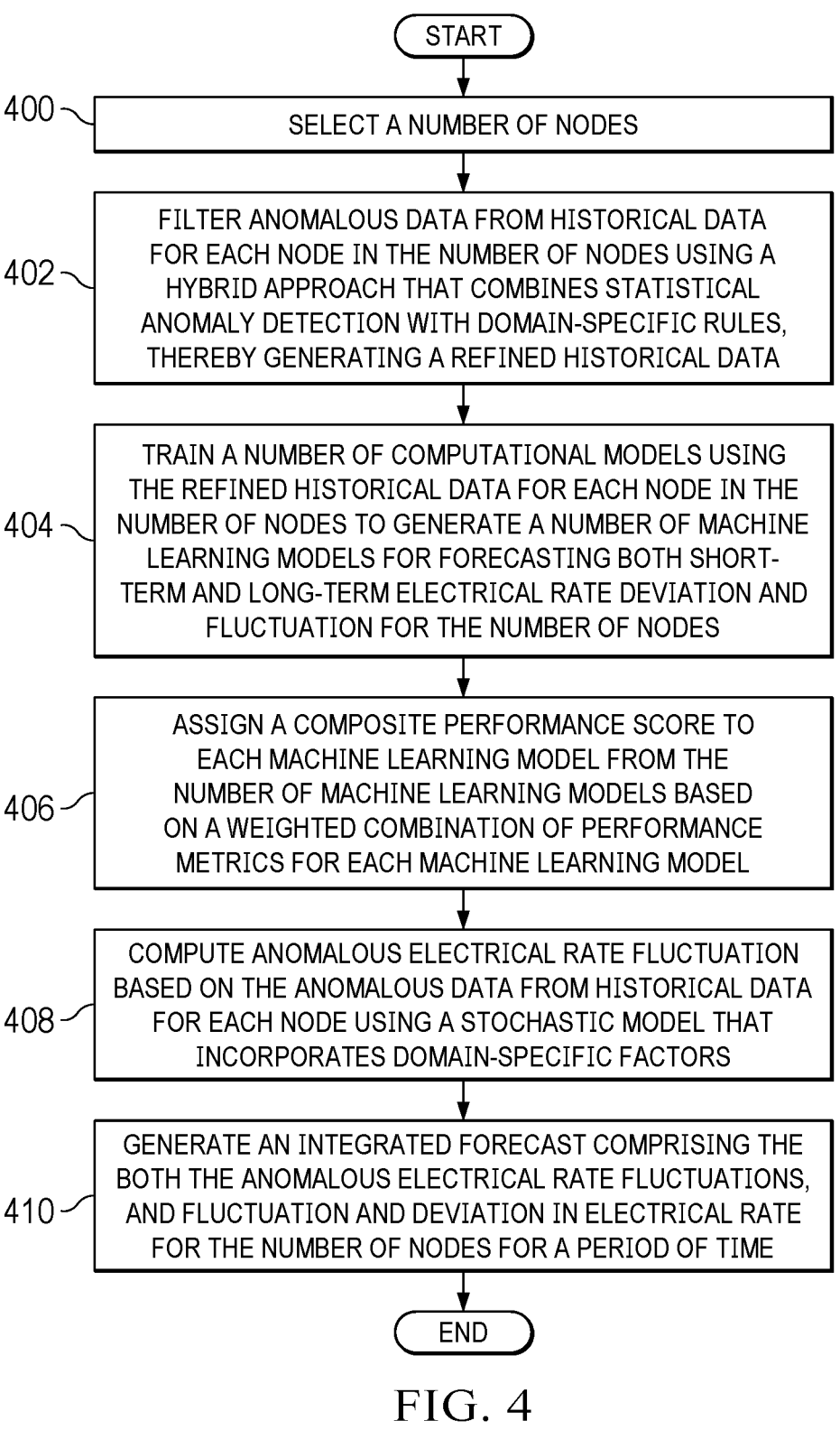
FIG. 4 depicts a flowchart illustrating a process for generating forecasts for substations for electrical grid in accordance with an illustrative embodiment.

FIG. 4 depicts a flowchart illustrating a process for generating forecasts for substations for electrical grid in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in electrical grid forecaster 222 in computer system 204 in FIG. 2.

The process begins by selecting a number of nodes (step 400). In this step, each node in the number of nodes represents a substation in an area for an electrical grid.

The process filters anomalous data from historical data for each node in the number of nodes using a hybrid approach that combines statistical anomaly detection with domain-specific rules, thereby generating a refined historical data (step 402). The process trains a number of computational models using the refined historical data for each node in the number of nodes to generate a number of machine learning models for forecasting both short-term and long-term electrical rate deviation and fluctuation for the number of nodes (step 404).

The process assigns a composite performance score to each machine learning model from the number of machine learning models based on a weighted combination of performance metrics for each machine learning model (step 406). The process computes anomalous electrical rate fluctuation based on the anomalous data from historical data for each node using a stochastic model that incorporates domain-specific factors (step 408).

The process generates an integrated forecast comprising both the anomalous electrical rate fluctuations, and fluctuation and deviation in electrical rate for the number of nodes for a period of time (step 410). The process terminates thereafter. In this step, the electrical rate fluctuation and deviation are forecasted using the machine learning model with highest composite performance score from the number of machine learning models.

Figure 5:
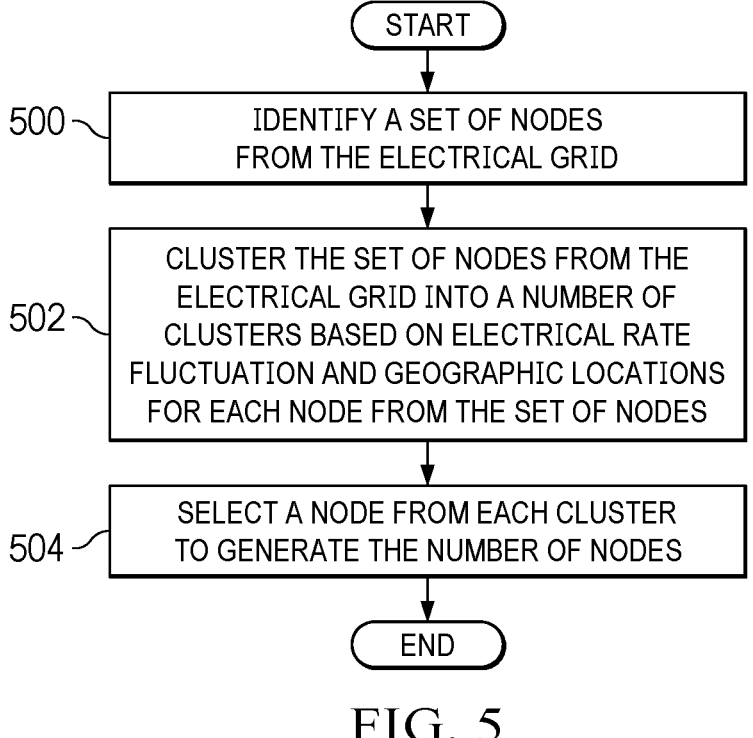
FIG. 5 depicts a flowchart illustrating a process for selecting nodes in accordance with an illustrative embodiment.

Turning next to FIG. 5, a flowchart of a process for selecting nodes is depicted in accordance with an illustrative embodiment. The process in this flowchart is an example of an implementation for step 400 in FIG. 5.

The process begins by identifying a set of nodes from the electrical grid (step 500). The process clusters the set of nodes from the electrical grid into a number of clusters based on electrical rate fluctuation and geographic locations for each node from the set of nodes (step 502). In step 502, each cluster for the set of nodes comprises nodes with similar electrical rate fluctuation and similar geographic locations.

The process selects a node from each cluster to generate the number of nodes (step 504). The process terminates thereafter.

Figure 6:
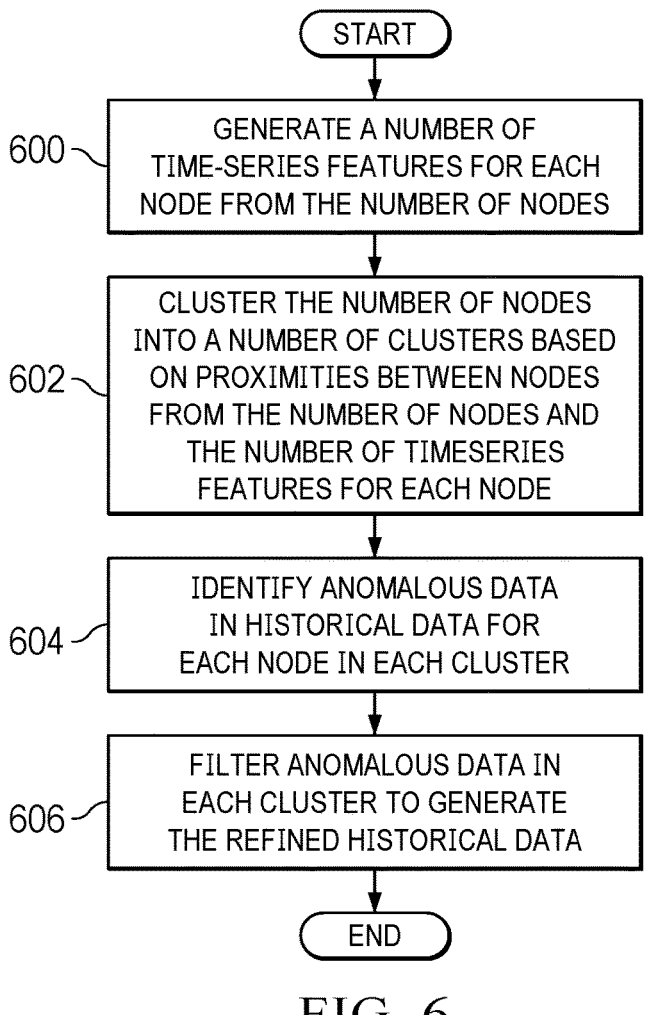
FIG. 6 depicts a flowchart illustrating a process for filtering anomalous data from historical data in accordance with an illustrative embodiment.

Turning next to FIG. 6, a flowchart of a process for filtering anomalous data from historical data is depicted in accordance with an illustrative embodiment. The process in this flowchart is an example of an implementation for step 402 in FIG. 5.

The process begins by generating a number of time-series features for each node from the number of nodes (step 600). The process clusters the number of nodes into a number of clusters based on proximities between nodes from the number of nodes and the number of time-series features for each node (step 602).

The process identifies anomalous data in historical data for each node in each cluster (step 604). In step 604, anomalous data in the historical data is identified based on unusual electrical rate fluctuation from nodes in the number of nodes. The process filters anomalous data in each cluster to generate the refined historical data (step 606). The process terminates thereafter.

Figure 7:
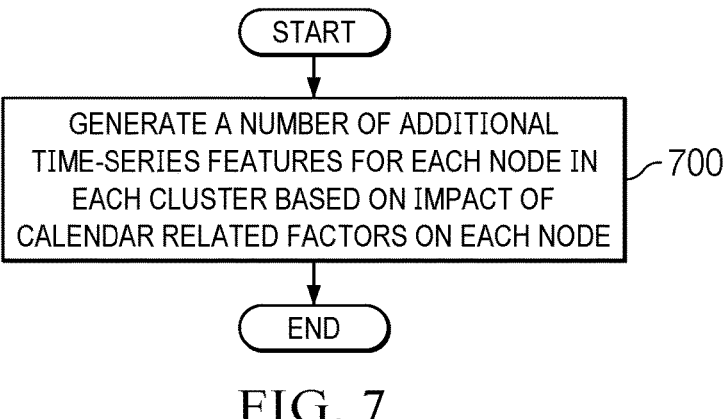
FIG. 7 depicts a flowchart illustrating a process for generating additional time-series features in accordance with an illustrative embodiment.

Turning next to FIG. 7, a flowchart of a process for generating additional time-series features is depicted in accordance with an illustrative embodiment. The process in this figure is an example of an additional step that can be performed with the steps in FIG. 6.

The process begins by generating a number of additional time-series features for each node in each cluster based on impact of calendar related factors on each node (step 700). The process terminates thereafter.

Figure 8:
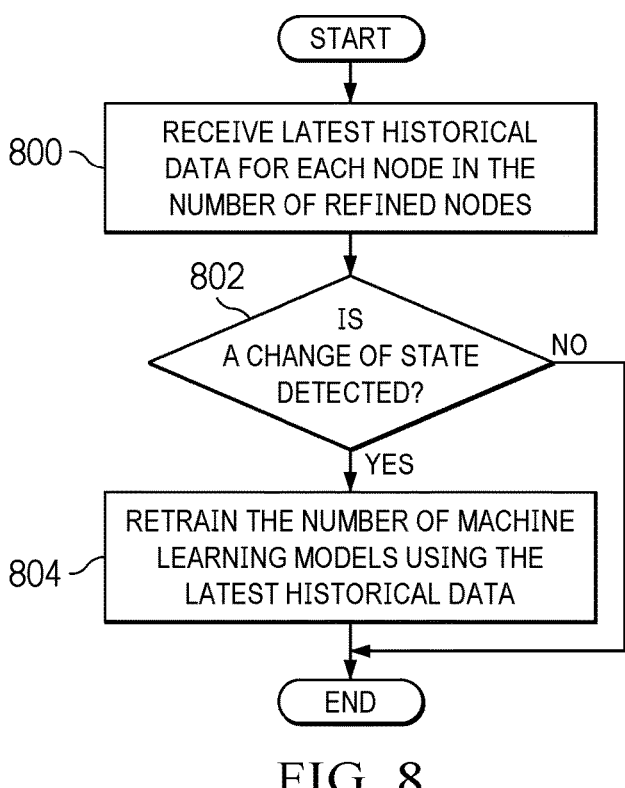
FIG. 8 depicts a flowchart illustrating a process for retraining machine learning models in accordance with an illustrative embodiment.

Turning next to FIG. 8, a flowchart of a process for retraining machine learning models is depicted in accordance with an illustrative embodiment. The process in this figure is an example of an additional step that can be performed with the steps in FIG. 4.

The process begins by receiving latest historical data for each node in the number of refined nodes (step 800). The process determines whether a change of state can be detected for the number of nodes (step 802). In step 802, the change of state can be detected by comparing the latest historical data to the historical data for each node in the number of nodes.

If a change of state can be detected, the process retrains the number of machine learning models using the latest historical data (step 904). The process terminates thereafter.

With reference again to step 802, if a change of state cannot be detected, the process terminates thereafter.

Figure 9:
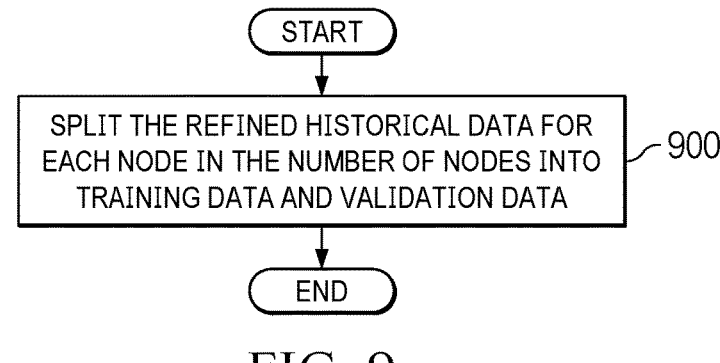
FIG. 9 depicts a flowchart illustrating a process for splitting data for training and validation in accordance with an illustrative embodiment.

Turning next to FIG. 9, a flowchart of a process for splitting data for training and validation is depicted in accordance with an illustrative embodiment. The process in this figure is an example of an additional step that can be performed with the steps in FIG. 4.

The process begins by splitting the refined historical data for each node in the number of nodes into training data and validation data (step 900). The process terminates thereafter. In step 900, the validation data comprises the refined historical data for each node in the number of refined nodes in past 12 months.

Figure 10:
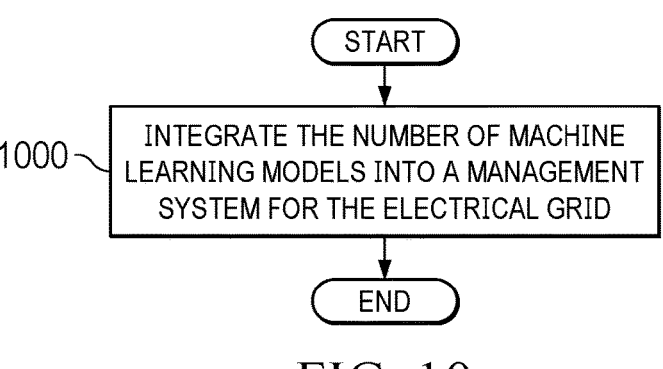
FIG. 10 depicts a flowchart illustrating a process for integrating machine learning models into a management system in accordance with an illustrative embodiment.

Turning next to FIG. 10, a flowchart of a process for integrating machine learning models into a management system is depicted in accordance with an illustrative embodiment. The process in this figure is an example of an additional step that can be performed with the steps in FIG. 4.

The process begins by integrating the number of machine learning models into a management system for the electrical grid (step 1000). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
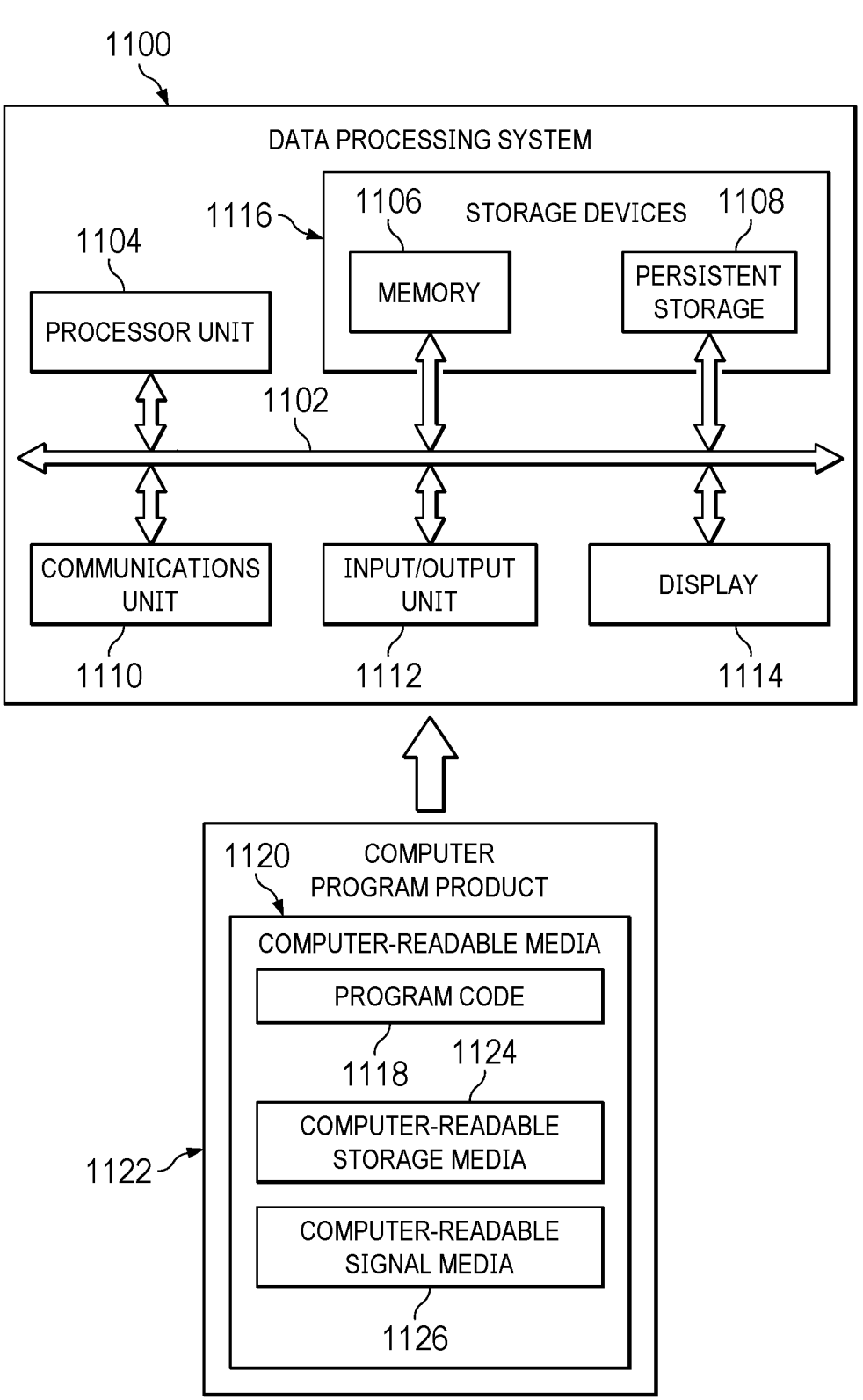
FIG. 11 is a block diagram of a data processing system in accordance with an illustrative embodiment.

Turning now to FIG. 11, an illustration of a block diagram of a data processing system is depicted in accordance with an illustrative embodiment. Data processing system 1100 may be used to implement server computer 104 and server computer 106 and client devices 110 in FIG. 1, as well as computer system 204 in FIG. 2. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1606. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (GPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for forecasting electrical grid stability, comprising:

selecting, by a processor set, a number of nodes, wherein each node in the number of nodes represents a substation in an area for an electrical grid;

filtering, by the processor set, anomalous data from historical data for each node in the number of nodes using a hybrid approach that combines statistical anomaly detection with domain-specific rules, thereby generating a refined historical data;

training, by the processor set, a number of computational models using the refined historical data for each node in the number of nodes to generate a number of machine learning models for forecasting both short-term and long-term electrical rate deviation and fluctuation for the number of nodes;

assigning, by the processor set, a composite performance score to each machine learning model from the number of machine learning models based on a weighted combination of performance metrics for each machine learning model;

computing, by the processor set, anomalous electrical rate fluctuation based on the anomalous data from historical data for each node using a stochastic model that incorporates domain-specific factors; and generating, by the processor set, an integrated forecast comprising both the anomalous electrical rate fluctuations, and fluctuation and deviation in electrical rate for the number of nodes for a period of time, wherein the fluctuation and deviation in electrical rate are forecasted using the machine learning model with highest composite performance score from the number of machine learning models.

2. The computer implemented method of claim 1, wherein selecting, by a processor set, a number of nodes comprises:

identifying, by the processor set, a set of nodes from the electrical grid;

clustering, by the processor set, the set of nodes from the electrical grid into a number of clusters based on electrical rate fluctuation and geographic locations for each node from the set of nodes, wherein each cluster for the set of nodes comprises nodes with electrical rate fluctuation and geographic locations; and selecting, by the processor set, a node from each cluster to generate the number of nodes.

3. The computer implemented method of claim 2, wherein the set of nodes from the electrical grid is clustered based on electrical rate fluctuation, geographic locations, and time-series features for each node from the set of nodes.

4. The computer implemented method of claim 1, wherein filtering, by the processor set, anomalous data from historical data for each node in the number of nodes to generate a refined historical data comprises:

generating, by the processor set, a number of time-series features for each node from the number of nodes;

clustering, by the processor set, the number of nodes into a number of clusters based on proximities between nodes from the number of nodes and the number of time-series features for each node;

identifying, by the processor set, anomalous data in historical data for each node in each cluster, wherein anomalous data in the historical data is identified based on unusual electrical rate fluctuation from nodes in the number of nodes; and filtering, by the processor set, anomalous data in each cluster to generate the refined historical data.

5. The computer implemented method of claim 4, further comprising:

generating, by the processor set, a number of additional time-series features for each node in each cluster based on impact of calendar related factors on each node.

6. The computer implemented method of claim 1, further comprising:

receiving, by the processor set, latest historical data for each node in the number of refined nodes;

determining, by the processor set, whether a change of state can be detected for the number of nodes by comparing the latest historical data to the historical data for each node in the number of refined nodes; and in response to a determination of a change of state, retraining, by the processor set, the number of machine learning model using the latest historical data.

7. The computer implemented method of claim 1, further comprising:

splitting, by the processor set, the refined historical data for each node in the number of nodes into training data and validation data, wherein the validation data comprises the refined historical data for each node in the number of refined nodes in the past 12 months.

8. The computer implemented method of claim 1, further comprising:

integrating, by the processor set, the number of machine learning models into a management system for the electrical grid.

9. The computer implemented method of claim 1, wherein performance for each machine learning model is assessed based on model error and a ratio of standard deviation of actual electrical rate for the number of nodes over a period of time and predicted electrical rate for the number of nodes over the same period of time.

10. The computer implemented method of claim 1, wherein the historical data comprises zonal price, demand, wind generation, solar generation, hydro generation, and zonal price differentials between different zones.

11. A computer system comprising:

a processor set;

a set of one or more computer-readable storage media; and program instructions, collectively stored in the set of one or more storage media, for causing the processor set to perform the following computer operations:

select a number of nodes, wherein each node in the number of nodes represents a substation in an area for an electrical grid;

filter anomalous data from historical data for each node in the number of nodes using a hybrid approach that combines statistical anomaly detection with domain-specific rules, thereby generating a refined historical data;

train a number of computational models using the refined historical data for each node in the number of nodes to generate a number of machine learning models for forecasting both short-term and long-term electrical rate deviation and fluctuation for the number of nodes;

assign a composite performance score to each machine learning model from the number of machine learning models based on a weighted combination of performance metrics for each machine learning model;

compute anomalous electrical rate fluctuation based on the anomalous data from historical data for each node using a stochastic model that incorporates domain-specific factors; and generate an integrated forecast comprising the both the anomalous electrical rate fluctuations, and fluctuation and deviation in electrical rate for the number of nodes for a period of time, wherein the fluctuation and deviation in electrical rate are forecasted using machine learning model with highest composite performance score from the number of machine learning models.

12. The computer system of claim 11, wherein as part of selecting a number of nodes, the program instructions, collectively stored in the set of one or more storage media, cause the processor set to perform the following computer operations:

identify a set of nodes from the electrical grid;

cluster the set of nodes from the electrical grid into a number of clusters based on electrical rate fluctuation and geographic locations for each node from the set of nodes, wherein each cluster for the set of nodes comprises nodes with electrical rate fluctuation and geographic locations; and select a node from each cluster to generate the number of nodes.

13. The computer system of claim 12, wherein the set of nodes from the electrical grid is clustered based on electrical rate fluctuation, geographic locations, and time-series features for each node from the set of nodes.

14. The computer system of claim 11, wherein as part of filtering anomalous data from historical data for each node in the number of nodes to generate a refined historical data, the program instructions, collectively stored in the set of one or more storage media, cause the processor set to perform the following computer operations:

generate a number of time-series features for each node from the number of nodes;

cluster the number of nodes based on proximities between nodes from the number of nodes and the number of time-series features for each node;

identify anomalous data in historical data for each node in each cluster, wherein anomalous data in the historical data is identified based on unusual electrical rate fluctuation from nodes in the number of nodes; and filter anomalous data in each cluster to generate the refined historical data.

15. The computer system of claim 14, wherein the program instructions, collectively stored in the set of one or more storage media, cause the processor set to further perform the following computer operations:

generate a number of additional time-series features for each node in each cluster based on impact of calendar related factors on each node.

16. The computer system of claim 11, wherein the program instructions, collectively stored in the set of one or more storage media, cause the processor set to further perform the following computer operations:

receive latest historical data for each node in the number of refined nodes;

determine whether a change of state can be detected for the number of nodes by comparing latest historical data to historical data for each node in the number of refined nodes; and in response to determine a change of state, retrain the number of machine learning model using the latest historical data.

17. The computer system of claim 11, wherein the program instructions, collectively stored in the set of one or more storage media, cause the processor set to further perform the following computer operations:

split the refined historical data for each node in the number of nodes into training data and validation data, wherein the validation data comprises the refined historical data for each node in the number of refined nodes in past 12 months.

18. The computer system of claim 11, wherein the program instructions, collectively stored in the set of one or more storage media, cause the processor set to further perform the following computer operations:

integrate the number of machine learning models into a management system for the electrical grid.

19. The computer system of claim 11, wherein performance for each machine learning model is assessed based on model error and a ratio of standard deviation of actual electrical rate for the number of nodes over a period of time and predicted electrical rate for the number of nodes over the period of time.

20. The computer system of claim 11, wherein the historical data comprises zonal price, demand, wind generation, solar generation, hydro generation, and zonal price differentials between different zones.

21. A computer program product comprising:

a set of one or more computer-readable storage media; and program instructions, collectively stored in the set of one or more storage media, cause a processor set to perform the following computer operations:

select a number of nodes, wherein each node in the number of nodes represents a substation in an area for an electrical grid;

filter anomalous data from historical data for each node in the number of nodes using a hybrid approach that combines statistical anomaly detection with domain-specific rules, thereby generating a refined historical data;

train a number of computational models using the refined historical data for each node in the number of nodes to generate a number of machine learning models for forecasting both short-term and long-term electrical rate deviation and fluctuation for the number of nodes;

assign a composite performance score to each machine learning model from the number of machine learning models based on a weighted combination of performance metrics for each machine learning model;

compute anomalous electrical rate fluctuation based on the anomalous data from historical data for each node using a stochastic model that incorporates domain-specific factors; and generate an integrated forecast comprising the both the anomalous electrical rate fluctuations, and fluctuation and deviation in electrical rate for the number of nodes for a period of time, wherein the fluctuation and deviation in electrical rate are forecasted using machine learning model with highest composite performance score from the number of machine learning models.

22. The computer program product of claim 21, wherein as part of selecting a number of nodes, the operation performed by the processor set comprises:

identify a set of nodes from the electrical grid;

cluster the set of nodes from the electrical grid into a number of clusters based on electrical rate fluctuation and geographic locations for each node from the set of nodes, wherein each cluster for the set of nodes comprises nodes with electrical rate fluctuation and geographic locations; and select a node from each cluster to generate the number of nodes.

23. The computer program product of claim 22, wherein the set of nodes from the electrical grid is clustered based on electrical rate fluctuation, geographic locations, and time-series features for each node from the set of nodes.

24. The computer program product of claim 21, wherein filtering anomalous data from historical data for each node in the number of nodes to generate a refined historical data, the operation performed by the processor set comprises:

generate a number of time-series features for each node from the number of nodes;

cluster the number of nodes based on proximities between nodes from the number of nodes and the number of time-series features for each node;

identify anomalous data in historical data for each node in each cluster, wherein anomalous data in the historical data is identified based on unusual electrical rate fluctuation from nodes in the number of nodes; and filter anomalous data in each cluster to generate the refined historical data.

25. The computer program product of claim 24, wherein program instructions, collectively stored in the set of one or more storage media further cause the processor set to:

generate a number of additional time-series features for each node in each cluster based on impact of calendar related factors on each node.

26. The computer program product of claim 21, wherein program instructions, collectively stored in the set of one or more storage media further cause the processor set to:

receive latest historical data for each node in the number of refined nodes;

determine whether a change of state can be detected for the number of nodes by comparing latest historical data to historical data for each node in the number of refined nodes; and in response to determine a change of state, retrain the number of machine learning model using the latest historical data.

27. The computer program product of claim 21, wherein program instructions, collectively stored in the set of one or more storage media further cause the processor set to:

split the refined historical data for each node in the number of nodes into training data and validation data, wherein the validation data comprises the refined historical data for each node in the number of refined nodes in past 12 months.

28. The computer program product of claim 21, wherein program instructions, collectively stored in the set of one or more storage media further cause the processor set to:

integrate the number of machine learning models into a management system for the electrical grid.

29. The computer program product of claim 21, wherein performance for each machine learning model is assessed based on model error and a ratio of standard deviation of actual electrical rate for the number of nodes over a period of time and predicted electrical rate for the number of nodes over the period of time.

30. The computer program product of claim 21, wherein the historical data comprises zonal price, demand, wind generation, solar generation, hydro generation, and zonal price differentials between different zones.

* * * * *